United States Patent [19]
Bertram et al.

[11] Patent Number: 5,765,688
[45] Date of Patent: Jun. 16, 1998

[54] EMBOSSED FOAM IN BAG CUSHIONS

[75] Inventors: George T. Bertram, Newtown; Abraham N. Reichental, Southbury; William R. Armstrong, Newtown, all of Conn.

[73] Assignee: Sealed Air Corporation, Saddle Brook, N.J.

[21] Appl. No.: 756,068

[22] Filed: Nov. 25, 1996

[51] Int. Cl.$^6$ ................................................ B65D 81/02
[52] U.S. Cl. .................... 206/523; 206/592; 206/320
[58] Field of Search ........................ 206/523, 591, 206/592, 320, 524, 588, 590

[56] References Cited

U.S. PATENT DOCUMENTS

| | | |
|---|---|---|
| 3,268,636 | 8/1966 | Angell, Jr. . |
| 3,330,407 | 7/1967 | Graves et al. . |
| 3,415,364 | 12/1968 | Schneider ................. 206/524 |
| 3,485,347 | 12/1969 | McGill et al. ............. 206/524 |
| 3,566,449 | 3/1971 | Goins et al. . |
| 3,768,724 | 10/1973 | Hill ............................ 206/523 |
| 3,794,549 | 2/1974 | Schroteler ................. 206/523 |
| 4,053,549 | 10/1977 | Vandor . |
| 4,208,368 | 6/1980 | Egli . |
| 4,240,557 | 12/1980 | Dickens . |
| 4,285,893 | 8/1981 | Contastin . |
| 4,479,914 | 10/1984 | Baumrucker . |
| 4,737,329 | 4/1988 | Rakoczy . |
| 4,740,258 | 4/1988 | Breitscheidel . |
| 4,783,292 | 11/1988 | Rogers . |
| 4,923,746 | 5/1990 | Balmisse et al. . |
| 4,927,044 | 5/1990 | Gotoh et al. . |
| 4,927,575 | 5/1990 | Brock et al. . |
| 5,098,621 | 3/1992 | Hermann . |
| 5,595,806 | 1/1997 | Korfmacher ............... 206/523 |

*Primary Examiner*—Paul T. Sewell
*Assistant Examiner*—Nhan T. Lam
*Attorney, Agent, or Firm*—Bell Seltzer Intellectual Property Group of Alston & Bird LLP

[57] ABSTRACT

A method and apparatus for preparing a defined foam cushion for packaging purposes comprises placing a foamable composition into a plastic bag, maintaining the bag in an orientation that provides the bag with a defined solid geometry while the foamable composition expands into foam, and embossing at least one surface of the defined geometry bag after the foam has substantially finished expanding but has not completely hardened.

12 Claims, 3 Drawing Sheets

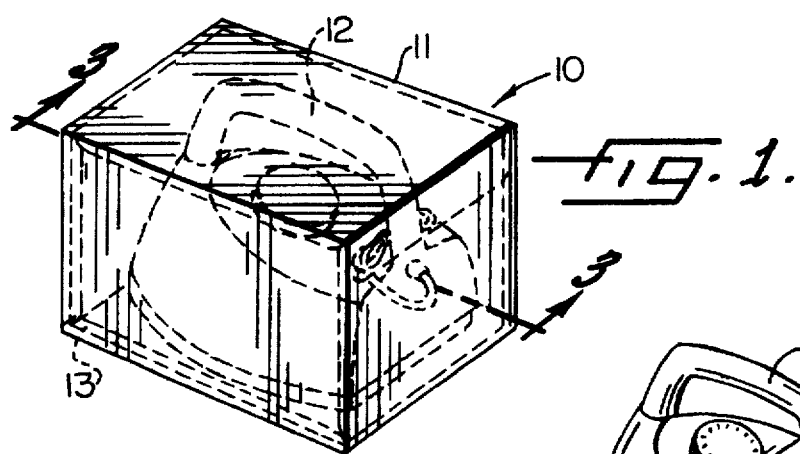
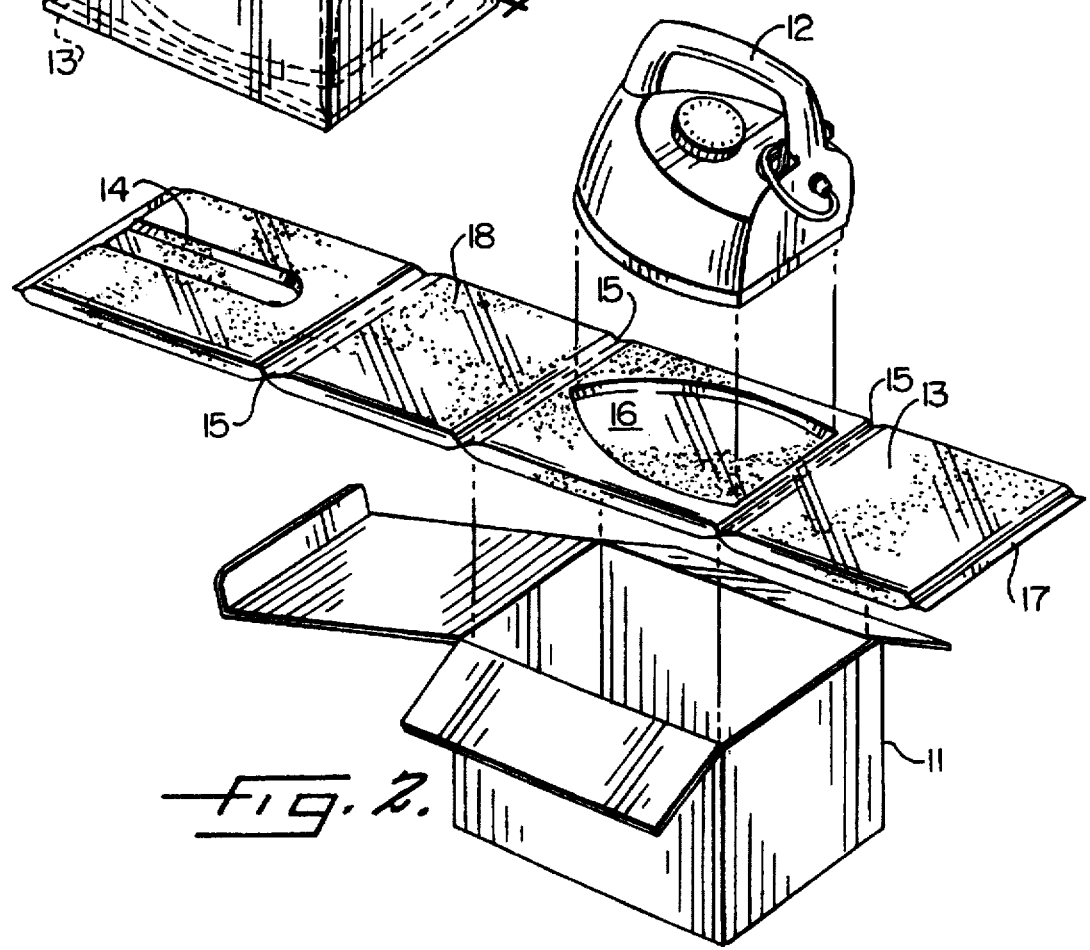
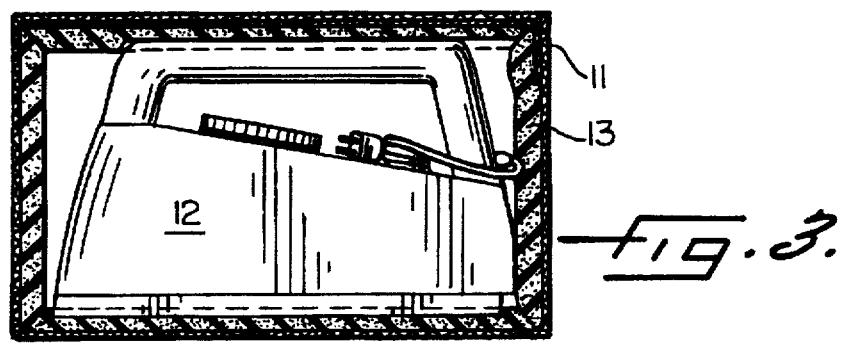

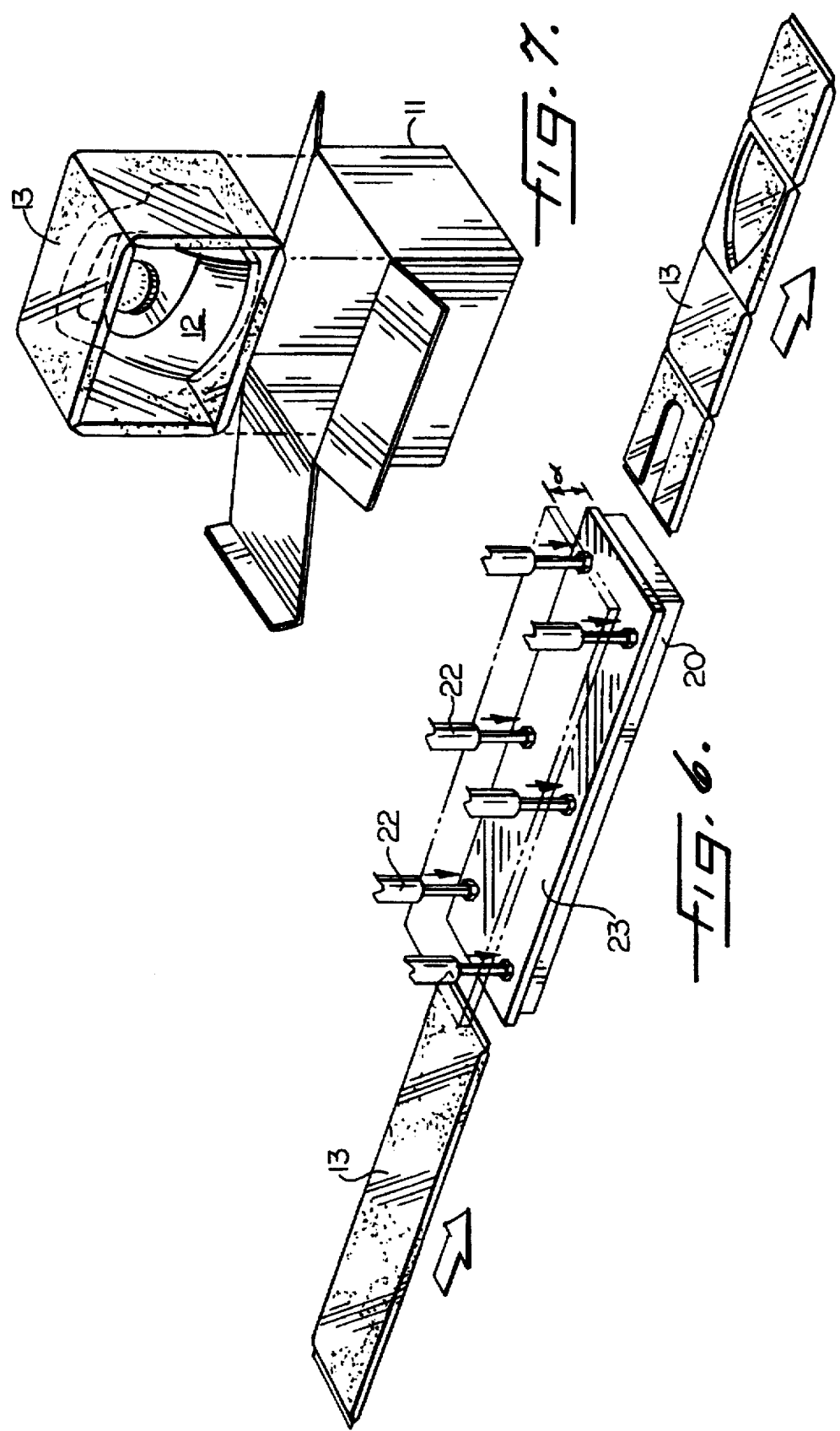

EMBOSSED FOAM IN BAG CUSHIONS

FIELD OF THE INVENTION

The present invention relates to protective packaging techniques, and more particularly relates to an apparatus and method for forming embossed foam panel cushions for packaging objects within containers.

BACKGROUND OF THE INVENTION

The present invention is related to foam-in-place packaging, and offers an alternative to high inventory packaging materials such as corrugated board forms and premolded polymer (e.g. polystyrene foam) packaging forms.

Foam-in-place packaging is a highly useful technique for on-demand protection of packaged objects. In its most basic form, foam-in-place packaging comprises injecting foamable compositions from a dispenser into a container that holds an object to be cushioned. Typically the object is wrapped in plastic to keep it from direct contact with the rising (expanding) foam. As the foam rises, it expands into the remaining space between the object and its container (e.g. a corrugated board box) thus forming a custom cushion for the object.

A common foaming composition is formed by mixing a diisocyanate with propylene glycol in the presence of some water and a catalyst. These precursors react to form polyurethane while at the same time generating carbon dioxide gas. As the gas escapes, it forms the foam cell structure that protects the packaged object.

In other types of foam-in-place packaging, the foam precursors are injected into a plastic bag which is then dropped into a container holding the object to be cushioned. The rising foam again tends to expand into the available space, but does so inside the bag. Because the bags are formed of flexible plastic, they form individual custom foam cushions for the packaged objects. In several techniques, a specific apparatus is used to make the bag from plastic film while concurrently injecting it with foam. Exemplary devices are assigned to the assignee of the present invention, and are illustrated, for example, in U.S. Pat. Nos. 5,027,583 and 5,376,219, and in pending application Ser. No. 08/514,010 filed Aug. 11, 1995 for "Compact Packaging Device for Forming Foam Filled Cushions and Related Method," the contents of each of which are incorporated entirely herein by reference.

Such foam-in-place packaging has gained wide acceptance in many industries. The nature of the technique and the cushions, however, are such that each individual cushion forms a shape that is dictated by a number of variables including the size and shape of the object being packaged, the size and shape of the container, the position of the object in the container, and the placement of the bag in the container before the foam finishes rising. As a result—and indeed as an advantage in many circumstances—each foam cushion tends to be a unique customized shape different from almost all other similar cushions. Any cushions that turn out similar or identical do so only by random chance. Accordingly, such random foam-in-place packaging cushions are highly sought after in packaging situations where different objects of different sizes and different shapes must be placed in different boxes on a regular basis. In such circumstances, cushions limited to specific shapes and sizes would represent a disadvantage rather than an advantage.

There are, however, other packaging applications in which similar or identical objects are repeatedly placed in similar or identical orientations in similar or identically sized containers. Such circumstances greatly decrease the need for continuously varying custom cushion sizes, and instead increase the need for more standard packaging elements that have a consistent size and shape.

To date, such standard packaging has been provided by several types of materials. Premolded polystyrene foam is one such common example, as are precut corrugated board (sometimes referred to colloquially as "cardboard"), pressed paper, and other similar materials.

Although such materials are quite useful, their precut (e.g. corrugated board) or premolded (e.g. polystyrene foam) nature requires maintaining an inventory of such materials that corresponds to the inventory of items to be packaged. Accordingly, in situations where a large number of objects must be packaged and shipped, a correspondingly large inventory of the packaging cushion materials must be kept in the immediate vicinity. Because the nature of most cushioning materials is such that they have a high ratio of volume to weight, they tend to take up a relatively large amount of space. Accordingly, such space must be provided and maintained in the immediate vicinity of the objects to be packaged. In a business environment, such inventory space represents a cost. Accordingly, a significant space savings represents a significant cost savings.

OBJECT AND SUMMARY OF THE INVENTION

Therefore, it is an object of the invention to provide a more standardized type of foam cushion that can be made on demand and yet which will consistently match or complement the shape of an object being packaged as well as the container in which the padded object is placed.

The invention meets this object with a method of preparing a defined foam cushion for packaging purposes which comprises placing a foamable composition into a plastic bag, maintaining the bag in an orientation that provides the bag with a defined solid geometry while the foamable composition expands into foam, and embossing at least one surface of the defined geometry bag after the foam has substantially finished expanding but is not completely hardened.

In another aspect, the invention comprises an embossed foam cushion.

In yet another aspect, the invention comprises an embossing apparatus that includes means for temporarily positioning and securing a foam-in-bag cushion, a template, and means for pressing the template against a foam cushion in the positioning means.

In another aspect, the invention comprises a method of packaging items using an embossed foam cushion.

The foregoing and other objects and advantages of the invention, and the manner in which the same are accomplished, will become more readily apparent upon consideration of the following detailed description of the invention taken in conjunction with the accompanying drawings, which illustrate preferred and exemplary embodiments and wherein:

BRIEF DESCRIPTION OF THE DRAWINGS

FIG. 1 is a perspective view of a packaged object;

FIG. 2 is an exploded perspective view of an object to be packaged, an embossed pad according to the present invention, and a container for the packaged object;

FIG. 3 is a cross-sectional view taken along lines 3—3 of FIG. 1;

FIG. 6 is a perspective view showing a foam cushion panel being embossed according to the method of the present invention; and FIG. 7 is an exploded perspective view of an item wrapped in an embossed panel according to the present invention along with its intended container.

DETAILED DESCRIPTION

Figure 4:
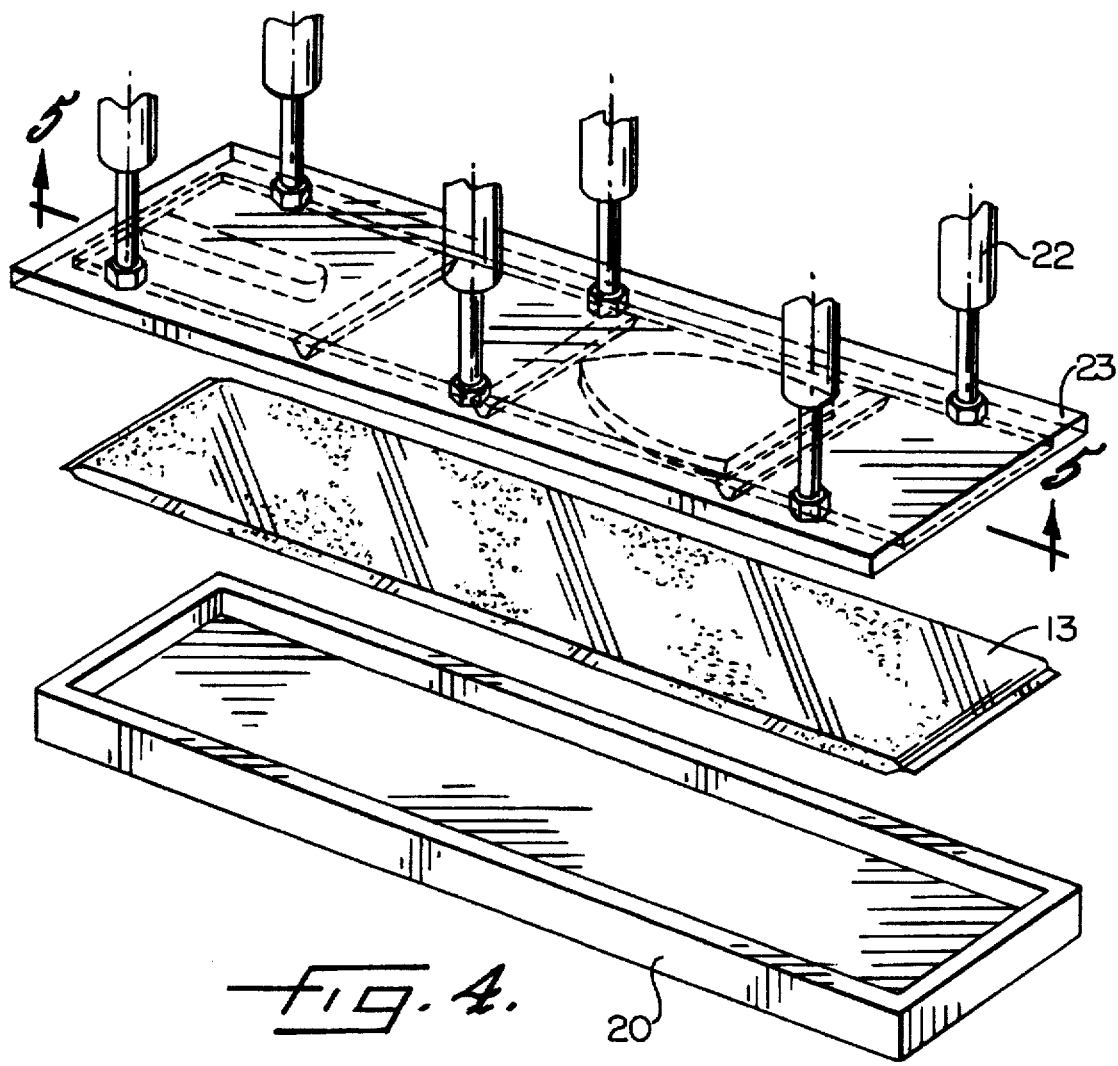
FIG. 4 is an exploded perspective view of an apparatus according to the present invention.

In a first aspect, the invention is a method of preparing a defined foam cushion for packaging purposes; i.e. a cushion whose shape is defined before the object to be packaged is placed therein. The method comprises placing a foamable composition into a plastic bag, maintaining the bag in an orientation that provides the bag with a defined (i.e. other than by the object) solid geometry while the foamable composition expands into foam, and embossing at least one surface of the defined geometry bag after the bag has substantially finished expanding but has not completely hardened. Stated differently, the bag's geometry is defined prior to any contact between the bag and the packaged item.

In preferred embodiments, the step of placing the foamable composition into the plastic bag comprises injecting the foamable composition from a remote supply of the foamable composition. As noted above, many foamable compositions are advantageously formed from two liquid precursors. As a rule of thumb, these precursors expand to over 200 times their liquid volume when they form foam. Thus, the use of the remote liquid precursors greatly reduces the need for packaging inventory space, and provides increased flexibility for locating the chemical precursors within any given facility. Those skilled in the art are familiar with the types of compositions useful as foam precursors. Exemplary compositions are widely available, including those from Sealed Air Corporation, Saddle Brook, N.J., the assignee of the present invention.

In preferred embodiments, the method of placing the foamable composition into the plastic bag can comprise placing the foamable composition into a tube and sealing both ends of the tube, or placing the foamable composition into a preformed bag through an opening in the bag and thereafter sealing the opening, or most preferably, forming the plastic bag while placing the foamable composition therein. In addition to the apparatus and methods set forth in the U.S. Patents and applications cited above for this purpose, Applicant's copending application Ser. No. 08/724, 736 filed Oct. 2, 1996 for "Foam Cushioning Panels for Packaging Purposes" also provides a useful technique for carrying out the step of maintaining the bag in a desired orientation while the foam forms, and is likewise incorporated entirely herein by reference. As noted in these patents and applications, the step of forming the bag also generally further comprises the step of forming a vent opening in the bag to permit gases generated by the foamable composition to escape without otherwise rupturing the bag.

In preferred embodiments, the step of maintaining the bag in an orientation that provides the bag with a defined solid geometry comprises maintaining the bag in an orientation that provides at least one flat surface, and in which circumstance the step of embossing the surface comprises embossing the flat surface. Most preferably, the bag is maintained in an orientation that provides a rectangular panel, one of the major surfaces of which is embossed. The step of making a flat panel cushion for packaging purposes is set forth in complete detail in copending U.S. Ser. No. 08/724,736 as noted above.

As used herein, the state in which the foam has finished expanding, but not yet hardened, represents the point at which the generation of gas from the chemical reaction has substantially ceased, or has otherwise reached a point of little or no effect. The overall polymerization reaction takes a little longer, however, thus providing a window of opportunity when the foam structure is flexible enough to be embossed, and to retain the embossed pattern, while not yet so resilient as to prevent embossing or to emboss less crisply than desired.

Thus, if the bag were to be embossed before the foam had finished expanding, the continued gas generation would tend to blur or eliminate the desired embossed pattern. Alternatively, if the bag were to be embossed after the polymer had fully cured, the embossing step could conceivably collapse the cell structure to an extent sufficient to weaken the cushion and render it useless for its intended purpose.

In preferred embodiments, the step of embossing the surface of the bag comprises pressing the surface with a raised pattern. It will be appreciated that embossing the surface by compressing the surface causes the foam density in unembossed regions of the cusion. In the most preferred embodiments, also the step of embossing the surface comprises embossing the surface with one or more creases that extend sufficiently into the bag to form a fold line at which the bag can fold around an object to be packaged.

Accordingly, in another aspect, the invention comprises a method of packaging an object with a defined foam cushion, the method comprising placing a foamable composition into a plastic bag, maintaining the bag in an orientation that provides the bag with a defined solid geometry while the foamable composition expands into foam, embossing at least one surface of the defined geometry bag after the foam has substantially finished expanding but is not completely hardened with a press having portions that compliment the shape of the object to be packaged, placing the object to be packaged adjacent the complementary shaped portion of the embossed bag, and placing the object and the cushion in a container that supports the cushion and the object. In the most preferred embodiments, the container is then closed to fix the position of the wrapped object and the cushion and thereby form a defined cushioned package for the object.

The drawings illustrate a number of aspects of the invention, including the described method. FIG. 1 illustrates a cushioned package broadly designated at 10. The package is formed of a rectangular solid container 11 which in preferred embodiments is typically formed of corrugated board. A packaged object illustrated as the iron 12 is in the container 11 along with a foam panel 13 that is adjacent portions of the iron 12 in the container 11. The foam panel 13 has embossed portions 14, 15, 16 (best illustrated in FIG. 2) on at least one surface that are in contact with and that complement the shape of the packaged object. In preferred embodiments, the foam panel 13 comprises a plastic bag 17 that encloses the polymer foam portion 18 and that substantially complements to the shape of the polymer foam portion 18, including the shape of the embossed portions 14, 15 and 16. Typically, the plastic bag 17 is fixed to the polymer foam portion 18. As noted with respect to the method, in preferred embodiments, the embossed pattern includes creases 15 that allow the panel 13 to be more conveniently folded so that when the item and the panel are packaged in the container (FIG. 1) the panel 13 is folded at the creases 15 in the container 11.

In preferred embodiments, the polymer foam comprises polyurethane, and the plastic bag comprises polyethylene. Nevertheless, those skilled in the art will recognize that although these are convenient and widely available materials, they are not limiting of the materials that can be used in accordance with the invention, and any suitable foam composition and bag material will suffice.

The cross-sectional view of FIG. 3 also illustrates the relationship between the packaged object 12, the foam panel 13, and the closed container 11 when the packaging step is complete.

In another aspect, the invention comprises the embossed foam cushion itself. As just noted, the cushion comprises a portion 18 of polymer foam having a solid geometry, an embossed pattern 14, 15, 16 on at least one surface of the polymer foam portion 18, and a plastic bag 17 that enclosed the polymer foam portion and that substantially conforms to the shape of the polymer foam portion including the shape of the embossed pattern.

As further noted previously, the plastic bag 17 is preferably fixed so the polymer foam portion 18 preferably forms a foam panel with at least some embossed creases 15.

If the bag 17 is made according to one of the methods described above, it will typically include two, three or four sealed edges and a ventilation opening of some sort, most preferably the plurality of small openings set forth in copending application Ser. No. 08/724,736 filed Oct. 2, 1996, and referred to above.

Figure 5:
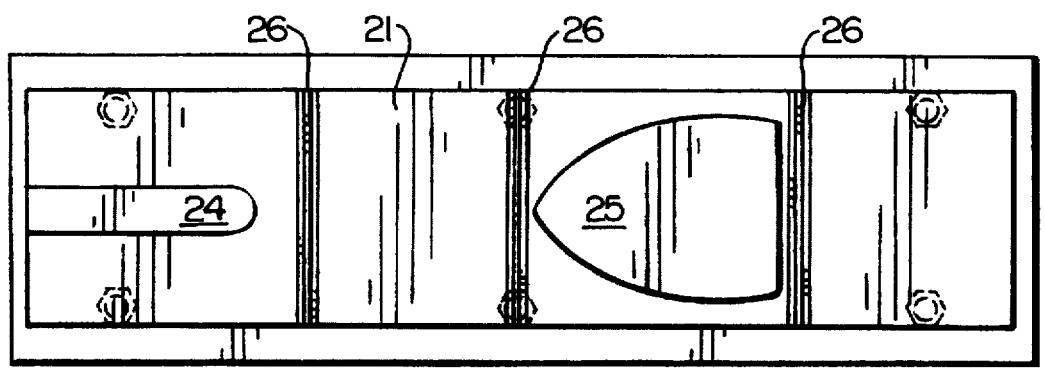
FIG. 5 is a bottom plan view taken along lines 5—5 of FIG. 4.

FIGS. 4, 5 and 6 illustrate an apparatus according to the invention for preparing an embossed foam cushion for packaging purposes. The apparatus comprises means shown as the receptacle 20 for temporarily positioning and securing a foam-in-bag cushion, and particularly a panel shaped cushion in the drawing of FIG. 4. The apparatus further includes a template 21 (FIG. 5) and means, shown as the plurality of reciprocating hydraulic cylinders 22 and the template mount 23 for pressing the template 21 against a foam cushion 13 in the positioning means 20. If desired or otherwise advantageous, the cylinders 22 can be pneumatically-driven or motor-driven, both types of equipment being well-understood in this art and generally easily available.

FIG. 5 illustrates that in preferred embodiments, the template comprises raised portions 24 and 25 that compliment the shape of an object to be packaged. In FIG. 5, and consistent with the remainder of the illustrations, the raised portion 24 compliments the handle of the iron 12 while raised portion 25 compliments the heating surface of the iron 12. In these most preferred embodiments, the raised portions of the template 21 include at least one anvil 26 that embosses a folding crease into a foam panel cushion when the cylinders 22 and the template mount 23 press the template 21 against the foam panel 13 in the receptacle 20.

The hydraulic cylinders 22 are otherwise conventional, and the particular arrangement of the cylinders 22, the template mount 23, the template 21, and the positioning means 20 can be developed by those of ordinary skill in this art and without undue experimentation. The materials used are similarly conventional, and in particular, wood provides a lightweight, inexpensive, and readily workable material for the template 21.

As noted above, the foam panel 13 can be produced on demand from a much smaller liquid volume. Accordingly, the method, apparatus, and embossed foam cushion provide a highly efficient method of providing defined packaging materials while at the same time greatly minimizing, and for many practical purposes eliminating, the need to keep a large volume of packaging inventory on hand.

In the drawings and specification, there have been disclosed typically preferred embodiments of the invention and, although specific terms have been employed, they have been used in a generic sense and descriptive sense only, and not for purposes of limitation, the scope of the invention being set forth in the following claims.

That which is claimed:

1. An embossed foam cushion for packaging purposes comprising:

a portion of polymer foam having a defined solid geometry, said polymer foam portion being formed by reacting a mixture of foam precursors such that the mixture expands and then hardens;

an embossed pattern on at least one surface of said polymer foam portion, said embossed pattern being formed by compressing at least one area of said surface after the mixture has substantially ceased expanding but before the mixture has completely hardened, whereby said foam portion has an increased foam density in the compressed area relative to uncompressed regions of said foam portion; and a plastic bag that encloses said polymer foam portion and that substantially conforms to the shape of said polymer foam portion, including the shape of said embossed pattern.

2. A foam packaging cushion according to claim 1 wherein said plastic bag is fixed to said polymer foam portion.

3. A foam packaging cushion according to claim 1 wherein said polymer foam portion comprises a foam panel.

4. A foam packaging cushion according to claim 3 wherein said embossed pattern includes embossed creases.

5. A foam packaging cushion according to claim 1 wherein said polymer foam comprises polyurethane and said plastic bag comprises polyethylene.

6. A foam packaging cushion according to claim 1 wherein said bag comprises three sealed edges.

7. A cushioned package comprising:

a rectangular solid container;

a packaged object in said container; and a foam panel adjacent portions of said object in said container, said foam panel being formed by reacting a mixture of foam precursors such that the mixture expands and then hardens, said foam panel having embossed portions on at least one surface that are in contact with and that complement the shape of the packaged object, said embossed portions being formed by compressing areas of said foam panel after the mixture has substantially ceased expanding but before the mixture has completely hardened, whereby said foam panel has an increased foam density in the compressed areas relative to uncompressed regions of said foam panel.

8. A cushioned package according to claim 7 wherein said foam panel comprises a plastic bag that encloses said polymer foam portion and that substantially conforms to the shape of said polymer foam portion, including the shape of said embossed pattern.

9. A cushioned package according to claim 8 wherein said plastic bag is fixed to said polymer foam portion.

10. A cushioned package according to claim 7 wherein said embossed pattern includes embossed creases, and said panel is folded at said creases in said container.

11. A cushioned package according to claim 8 wherein said polymer foam comprises polyurethane and said plastic bag comprises polyethylene.

12. A cushioned package according to claim 8 wherein said container is formed of corrugated board.

* * * * *